United States Patent
Klee et al.

(10) Patent No.: US 8,133,053 B2
(45) Date of Patent: Mar. 13, 2012

(54) ELECTRIC MOTOR FOR USE IN A DENTAL, DENTAL-MEDICAL OR DENTAL-TECHNICAL HANDPIECE AND STATOR THEREFOR

(75) Inventors: Alexander Klee, Biberach (DE); Alfons Mader, Isny (DE)

(73) Assignee: Kaltenbach & Voigt GmbH, Biberach (DE)

( * ) Notice: Subject to any disclaimer, the term of this patent is extended or adjusted under 35 U.S.C. 154(b) by 541 days.

(21) Appl. No.: 12/159,071

(22) PCT Filed: Mar. 27, 2008

(86) PCT No.: PCT/EP2008/002417
§ 371 (c)(1),
(2), (4) Date: Aug. 15, 2008

(87) PCT Pub. No.: WO2008/116649
PCT Pub. Date: Oct. 2, 2008

(65) Prior Publication Data
US 2010/0261140 A1    Oct. 14, 2010

(30) Foreign Application Priority Data
Mar. 27, 2007 (DE) .................. 10 2007 014 691

(51) Int. Cl.
*A61C 1/00* (2006.01)

(52) U.S. Cl. ............................ 433/131; 433/115; 310/87

(58) Field of Classification Search .................. 433/131, 433/114–115, 133; 310/85–89
See application file for complete search history.

(56) References Cited

U.S. PATENT DOCUMENTS

| 3,989,284 A * | 11/1976 | Blose ........................ 285/332.2 |
| 4,212,640 A * | 7/1980 | Loge et al. ...................... 433/82 |
| 4,437,027 A | 3/1984 | Yamamoto et al. |
| 4,482,829 A * | 11/1984 | Tardieu et al. ................. 310/105 |
| 4,486,176 A * | 12/1984 | Tardieu et al. ................. 433/133 |
| 4,492,889 A | 1/1985 | Fukushi et al. |
| 5,803,733 A * | 9/1998 | Trott et al. .................... 433/132 |
| 5,965,694 A | 10/1999 | Hirschmann et al. |
| 6,126,442 A * | 10/2000 | Knorpp et al. ................ 433/126 |
| 6,132,213 A * | 10/2000 | Knorpp et al. ................ 433/131 |
| 2005/0112003 A1 | 5/2005 | Jones et al. |
| 2009/0004622 A1* | 1/2009 | Kuhn et al. .................... 433/131 |
| 2010/0233651 A1* | 9/2010 | Kuhn et al. .................... 433/131 |

FOREIGN PATENT DOCUMENTS
JP      2005-086905 A      3/2005
WO     WO-2004/036052 A1  4/2004

OTHER PUBLICATIONS

English-language translation of International Search Report and Written Opinion for Application No. PCT/EP2008/002417, dated Aug. 22, 2008.
English-language translation of International Preliminary Report on Patentability for Application No. PCT/EP2008/002417, dated Oct. 6, 2009.

* cited by examiner

*Primary Examiner* — Cris L Rodriguez
*Assistant Examiner* — Hao D Mai
(74) *Attorney, Agent, or Firm* — Marshall, Gerstein & Borun LLP

(57) ABSTRACT

In an electric motor for use in a dental, dental-medical or dental-technical handpiece, having a rotatably mounted rotor and a stator surrounding the rotor, the stator is surrounded by a sheathing having an inner sleeve, on the outside of which there are arranged functionally relevant components of the stator, for example stator winding(s), return plates, and/or contact pins, and an outer sleeve embedding the inner sleeve with the functionally relevant components.

12 Claims, 3 Drawing Sheets

ELECTRIC MOTOR FOR USE IN A DENTAL, DENTAL-MEDICAL OR DENTAL-TECHNICAL HANDPIECE AND STATOR THEREFOR

BACKGROUND OF THE INVENTION

1. Field of the Invention

The present invention relates to an electric motor which is provided for use in a dental, dental-medical or dental-technical handpiece, and a stator therefore. In particular the present invention relates to a so-called collectorless motor.

2. Related Technology

In dental, dental-medical or dental-technical handpieces treatment or working instruments are put into rotation or vibration with the aid of a drive. The drive may on the one hand be configured in the form of an air turbine or an air motor; alternatively to this also the use of electric motors has gained increased acceptance in recent times. Here there are put to use in particular so-called collectorless or brushless dc motors (BLDG motors), the rotor of which has at least one permanent magnet. Such motors stand out due to their high efficiency.

Difficulties in the use of such electric motors in the handpieces mentioned above consist, however, in that the handpieces must regularly be cleaned and sterilized for hygienic reasons. Sterilizing is normally effected in that the handpiece is exposed to an atmosphere with high humidity and high temperature, to kill organisms possibly present. However, precisely the combination from high atmospheric humidity and high temperature has the consequence that the sensitive components of an electric motor may be damaged. Here, particularly problematic are the functionally relevant components of the stator, that is for example the stator windings, the return plates and/or the contact pins, since here the penetration of hot steam can lead to corrosion and/or structural changes and can correspondingly damage the components.

To avoid damage to the electric motor in the context of the regular cleaning or sterilization, in the past handpieces were conceived in which the motor, in the form of a separate component, could be selectively put in place in the handpiece and removed again. Then for cleaning purposes the motor was initially removed and exclusively the handpiece sleeve cleaned. It was avoided in this way that the motor was repeatedly exposed to the high temperatures of sterilizing, so that the operating life thereof was extended. Of disadvantage with this concept is, however, that the motor is not arranged fixed in the handpiece housing with respect to the further elements of the power train, which during operation in particular at high rotational speeds can lead to problems. A precise transmission of motion from the motor to the treatment or operating tool is only then ensured when the motor is arranged fixedly and permanently within the handpiece. Further, a fixed arrangement of the motor in the handpiece would lead to a lighter and more compact manner of construction, which would improve the handling of the handpiece considerably for the user or dentist.

SUMMARY OF THE INVENTION

The present invention is based correspondingly on the object of providing a novel electric motor which is suitable to resist external influences within the scope of a sterilizing process and which can correspondingly be arranged permanently in a dental, dental-medical or dental-technical handpiece.

The idea in accordance with the invention is in particular based on a particular configuration of the stator. It is thus provided that this is surrounded by a sheathing, preferably a plastic sheathing, which protects the functionally relevant components of the stator during the sterilizing process. Hereby it is in particular provided that the sheathing on the one hand has an inner sleeve, on the outside of which the functionally relevant components of the stator, for example stator windings, return plates and/or contact pins, are arranged, as well as an outer sleeve embedding the inner sleeve with the functionally relevant components.

Correspondingly, in accordance with a first aspect of the present invention, there is proposed an electric motor for use in a dental, dental-medical or dental-technical handpiece having a rotatably mounted rotor and a stator surrounding the rotor, which is characterize in that the stator is surrounded by a sheathing, preferably a plastic sheathing, which has a) an inner sleeve, on the outside of which there are arranged functionally relevant components of the stator, for example stator windings, return plates, and/or contact pins, and b) an outer sleeve embedding the inner sleeve with the functionally relevant components.

In accordance with a second aspect of the present invention there is proposed a stator for the formation of an electric motor, in particular a brushless dc motor, which is provided for use in a dental, dental-medical or dental-technical handpiece, wherein the stator is characterize in that it is surrounded by a sheathing, preferably by a plastic sheathing, which has a) an inner sleeve, on the outside of which there are arranged functionally relevant components of the stator, for example stator windings, return plates, and/or contact pins, and b) an outer sleeve embedding the inner sleeve with the functionally relevant components.

The sheathing of the stator in accordance with the invention leads to a particularly good sealing and therewith to a protection of the functionally relevant components of the stator, so that these are protected effectively from the hot steam during the process of sterilization. Through the division of inner sleeve and outer sleeve particular advantages arise which will be explained below.

Thus it is in particular provided that the outer sleeve is applied in injection moulding process onto the inner sleeve with the functionally relevant components arranged thereon. This has the consequence that upon cooling of the injected around plastic thus shrinks from the outside onto the inner sleeve so that a certain compressive stress arises in the connection region of the two bodies, which in the following is also called a seam. This seam can here be effected, by particular measures which are explained below, to be long, so that the steam under pressure must cover a relatively long path until it can advance as far as, and damage, the functionally relevant stator components. The above-described procedure for the production of the stator in accordance with the invention is correspondingly based not only on a manufacturing method which can be carried out relatively simply but also leads to a particularly good protection of the sensitive stator components.

To additionally increase sterilizability it can be provided in accordance with a further advantageous development of the invention that the inner sleeve and the outer sleeve are interlocked with each other in particular at the two end regions of the stator. Also an interlocking between inner sleeve or outer sleeve and the contact pins can be provided, in which this interlocking is formed by at least one circumferential groove or a web on the inner sleeve or the contact pins and a corresponding configuration of the outer sleeve or inner sleeve. The grooves or webs can have a rectangular shaped profile for this purpose or by means of additional undercuts provide for a further improved anchorage between inner sleeve and outer sleeve or between outer sleeve and the contact pins. To this end the grooves may for example have a dovetail profile on one side or on both sides. This particular kind of the interlocking leads to further effects which appear during the process of sterilization and lead to a further improved sealing so that the sterilizability of the stator is optimized. In the end, these measures provide that the electric motor can be repeatedly sterilized, without damage to the individual motor components having to be feared as in the past.

As material for the inner sleeve and for the outer sleeve there is preferably used a high performance plastic which is sold under the brand name PEEK. This material distinguishes itself due to its good material characteristic values, in particular also at high temperatures, as are present upon sterilization. This plastic further is hydrolysis resistant. Thereby it can further be provided that the materials for inner sleeve and outer sleeve have different thermal expansion coefficients. Finally, it would also be conceivable to form the inner sleeve of ceramic.

BRIEF DESCRIPTION OF THE DRAWINGS

Below, the invention will be explained in more detail with reference to the accompanying drawings. There is shown.

DETAILED DESCRIPTION

Figure 1:
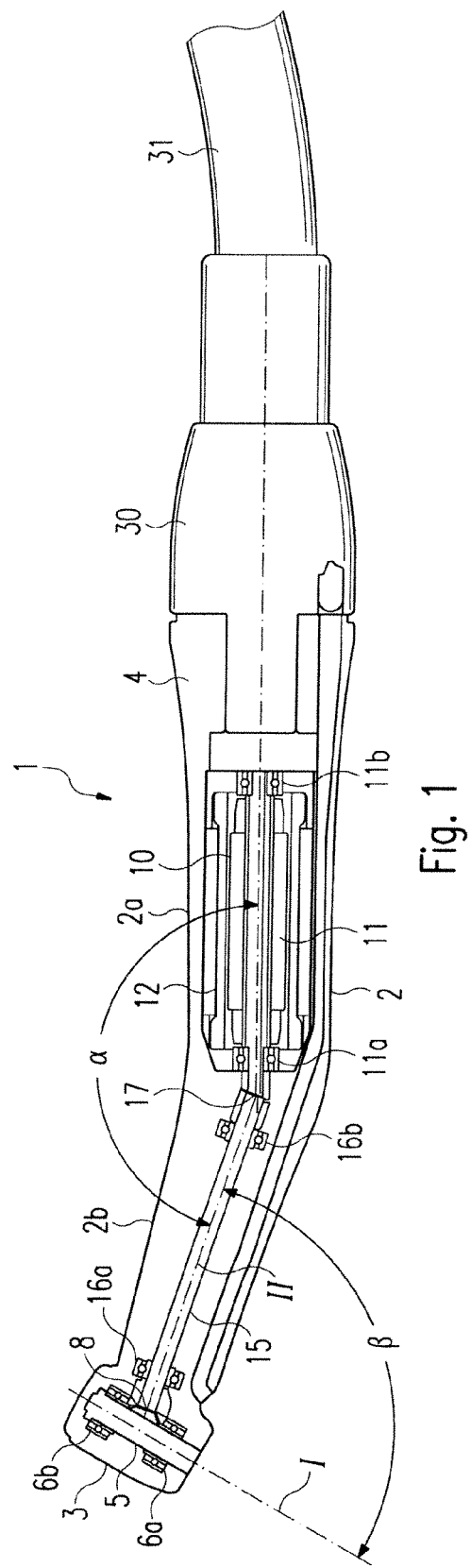
FIG. 1 the illustration of a dental handpiece with which the use of an electric motor in accordance with the invention is planned.

The handpiece schematically illustrated in FIG. 1 and generally provided with the reference sign 1, with which the electric motor in accordance with the invention is put to use, has an elongate grip sleeve 2 which is divided into a rearward region 2a and a forward region 2b, wherein the two regions 2a, 2b include with each other an angle of about 155° to 170°. The handling of the handpiece 1 within the mouth of a patient is simplified by this configuration. It should, however, be noted at this point that the use of the electric motor in accordance with the invention, described in more detail below, is not restricted to such so-called angled handpieces. Rather, the motor can be generally put to use with dental, dental-medical or dental-technical handpieces.

At the forward end of the grip sleeve there is located the head section of the handpiece 1 which has a tool receiver 5 mounted rotatably by means of two bearings 6a, 6b. This tool receiver is provided in particular for receiving dental drills. For ergonomic reasons it can further be provided that the head section 3 is configured such that the longitudinal axis 1 of the tool receiver 5 includes with the axis 2 of the forward end region 2b of the grip sleeve an angle β of about 100°.

At the rearward end of the grip sleeve 2 this is connected to the connecting part 30 of a supply hose 31. This hose 31 leads to a supply facility of a dental treatment station (not illustrated) and serves to make available to the handpiece 1 the media necessary for operation. Here, this is in particular current, which is used for the operation of the motor. Also additional treatment media such air and/or water can be carried via the hose 31 to the handpiece 1. The connection of the handpiece 1 is then carried out via a coupling element 4 situated in the rearward end, via which a connection with the hose connector 30 is effected.

Considered in principle, dental handpieces can be configured with different drives. For example air or turbine drives or electrical drives are classically put to use. Here, a turbine stands out due to its compact manner of construction; on the other hand the operational reliability is lesser in comparison with an electric motor. Further, in comparison with an electric motor, there are only restricted possibilities for controlling the power to be transferred.

To date, electric motors had, however, the disadvantage that by their use the manner of construction of the handpiece was increased in size. Measures had further to be taken to ensure that the sensitive components of the motor are not damaged during the sterilization process. In the past dental handpieces with an electric motor were therefore normally configured such that the motor could be removed before the cleaning or sterilization of the handpiece.

In contrast thereto, with the handpiece 1 in accordance with FIG. 1 it is provided that the motor, provided with the reference sign 10, is arranged permanently within the handpiece sleeve 2. The motor 10 has on the one hand a stator 12 mounted fixedly—i.e. not rotatably—in the handpiece sleeve 2, and on the other hand a rotor 11 mounted rotatably with respect to the stator 12 with the aid of two bearings 11a and 11b. The rotation produced by the motor 10 is transferred to the tool receiver 5 by means of a shaft 15 which extends through the forward grip sleeve region 2b. This shaft 15, which is mounted rotatably by means of two roller bearings 16a and 16b, is for this purpose coupled at its rearward end via knee transmission 17 with the rotor 11 of the electric motor 10; at the forward end a coupling 15 and tool receiver 5 is effected by means of a head transmission 8. The advantage of this fixed arrangement of the motor 10 in the handpiece sleeve 2 consists in that—as illustrated—merely three axes or shafts mounted rotatably (the rotor 11, the intermediate shaft 15 and the tool receiver 5) are required in order, by means of the voltage applied to the handpiece 1, to set the drill, or generally the tool, into rotation.

The permanent arrangement of the motor 10 in the handpiece sleeve 2 means, however, that particular measures must be taken to avoid damage to the motor 10 during sterilizing. With this motor 10 illustrated in FIG. 2 in a sectional illustration there is preferably involved a collectorless or brushless dc motor with a permanent magnet rotor. Such so-called BLDG (brushless direct current) motors stand out due to their high efficiency, which is provided also in particular by a corresponding control of the stator windings. The current supply of the stator windings, the so-called commutation, adapted to the disposition or the angular position of the rotor 11, is ensured by corresponding control electronics, which permanently detect the bearings of the rotor 11 and correspondingly supply the windings with current of a suitable phase. Normally with such miniaturized motors a power of more than 10 watts, in particular a power in the region between 10 and 40 watts, or even higher for a short time, can be achieved.

Figure 2:
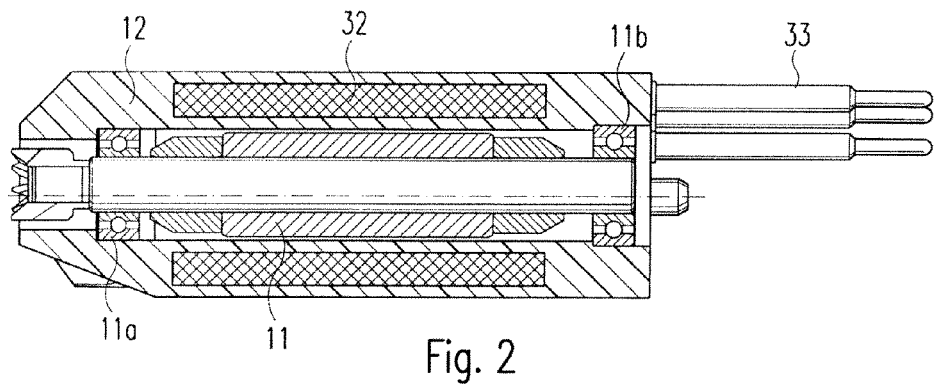
FIG. 2 sectional view of an electric motor.
Figure 3:
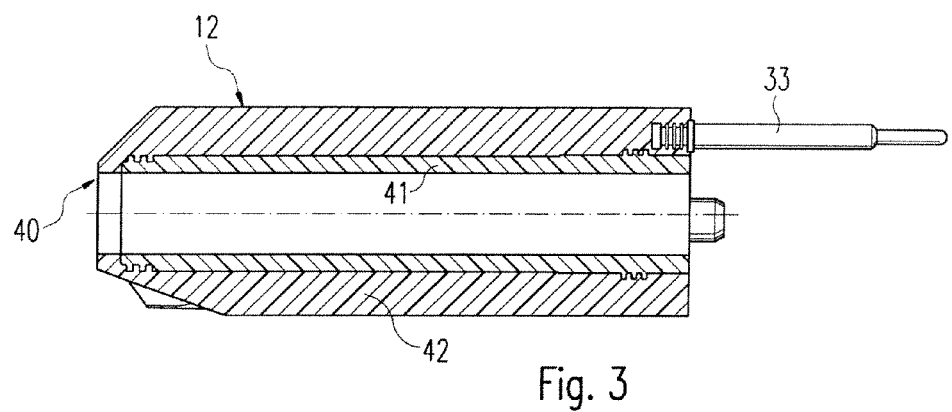
FIG. 3 the configuration of a stator in accordance with the invention, in section.

The functionally relevant components of the stator 12 of the motor 10, which are indicated schematically with the reference sign 32 in FIG. 2, are particularly endangered during sterilizing. These include for example the stator windings as well as the return plates. Problems can appear also in the connection region of the contact pins 33 of the stator 12 upon penetration of hot steam which is used to sterilize the handpiece.

For the protection of these components it is provided in accordance with the present invention that these are sheathed in a special manner. The special configuration of this sheathing in accordance with the invention will be explained below in more detail with reference to FIGS. 3 to 8. These Figures show sectional illustrations of the stator, whereby illustration of the functionally relevant stator components is omitted, in order better to be able to show the construction of the sheathing.

Considered in principle, two central ideas mark the structure of the stator 12 in accordance with the invention. Thus, on the one hand it is initially provided that the stator 12 distinguished as a hollow cylinder is formed by means of two sleeves, on the one hand an inner sleeve 41 extending also throughout and on the other hand an outer sleeve 42 adjoining to the inner sleeve 41. The functionally relevant components are attached on the inner sleeve 41, thus in particular the windings, the return plates and the contact pins. The packet obtained in this way is then, for further production of the stator 12 or the sheathing 40, placed in an injection moulding tool then injected around with plastic, in order in this way to form the outer sleeve 42. In accordance with a first preferred embodiment there is employed for the formation of the inside, thus also the outer sleeve 41, 42 the plastic material PEEK, which is available both in readily flowable and also glass fiber reinforced variants. This material has proved to be particularly advantageous with regard to the sterilizability striven for, since it has good material characteristic values even at high temperatures and is further hydrolysis resistant. A further advantageous configuration could also consist in forming the inner sleeve 41 of a ceramic material. It has turned out that in this case advantages can be obtained with regard to wear resistance, the high hardness of the inner sleeve as well as a better resistance to warping.

The procedure described above for the production of the stator 12 brings about the advantage on the one hand that the stator 12 can to be produced in relatively simple manner and nonetheless the sensitive components can be sheathed. A particular advantage consists, however, in that upon cooling of the injected around plastic for the formation of the outer sleeve 42 this shrinks from the outside onto the inner sleeve 41. This has the consequence that at the junction point between the two sleeves 41, 42, which is also called a seam in the following, a certain compressive stress arises. Hereby, this seam is made as long as possible so that during the process of sterilization the steam under pressure must travel a very long path before it can advance to the functionally relevant stator components and damage these.

Through the two-part construction of the sheathing 40 of the stator 12 described above, there is thus already attained an improved protection for the sensitive stator components. If one takes into account, however, the physically dictated thermal expansion of all components of the stator 12, then a further problem could additionally arise. Namely if the complete stator 12 is heated up during sterilizing, then the volume of the components located therein increases. If a material which—seen radially—is mounted on the outside in the stator 12 has a greater thermal expansion coefficient than the material lying inwardly, then the connection seam will be opened if the materials are not hindered in their expansion; at least, however, the compressive stress mentioned above is reduced. The same difficulties can arise also for the contact pins 33 injected in with their end regions. If the material of these pins 33 expands less strongly than the plastic of the outer sleeve 42 surrounding them, then a gap could arise, into which the steam can penetrate. In an axial direction, through the larger dimension in comparison with the diameter of the stator 12 and therewith nominally greater expansion there can arise exactly at the seam relative movement of the two sleeves 41, 42 if the thermal expansion coefficients are not identical.

In order correspondingly to optimize sterilizability, further measures were taken which prevent an opening of the seam and correspondingly the relative movement mentioned above. These measures will now be explained with reference to the enlarged details of FIGS. 4 to 7.

The further development in accordance with the invention consists in that the inner sleeve 41 and outer sleeve 42 are interlocked with each other at the two axial end regions of the stator 12. Further, an interlocking is also provided between outer sleeve 42 and the end regions of the contact pins 33.

Figure 4:
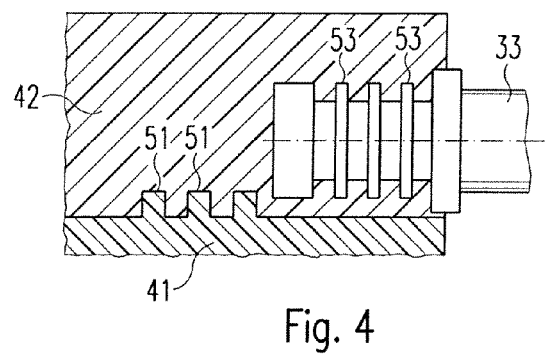
FIG. 4 an enlarged detail of the illustration of FIG. 3 for clarification of the interlocking between inner sleeve and outer sleeve or between outer sleeve and contact pin.

As the enlarged scale illustration of FIG. 4 shows, the interlocking between inner sleeve 41 and outer sleeve 42 is achieved in that the inner sleeve has a plurality of circumferential webs 51 or grooves formed therein. Through this a mechanical form-fitting is brought about, i.e. the plastic materials of inner sleeve 41 and outer sleeve 42 engage comb-like into one another and interlock. In the same manner the end regions of the contact pins 33 also have corresponding circumferential webs 53 or grooves formed therebetween. Also here, upon injection around of the arrangement with the plastic material of the outer sleeve 42, mechanical form-fitting is achieved.

The webs 51 or 53 of the inner sleeve 41 as well as the contact pins 33 have in the illustrated embodiment surfaces extending in a radial direction and parallel. In this way the path which the hot steam would have to travel to penetrate into the interior of the stator 12 is increased. Correspondingly a kind of labyrinth seal is thus formed, through which the protection of the sensitive stator components is further improved.

Figure 5:
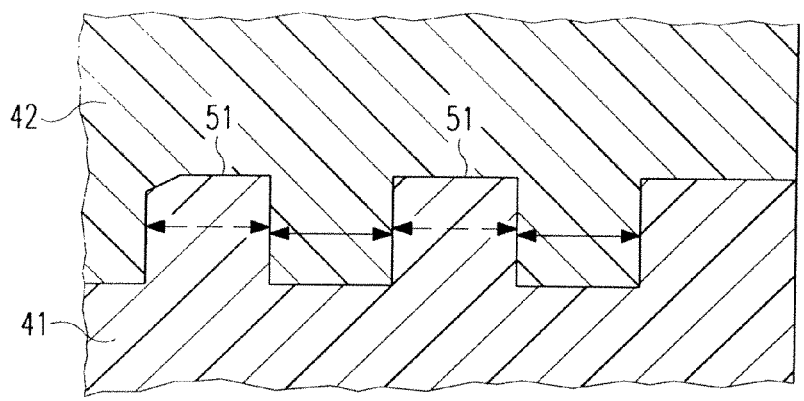
FIG. 5 a further enlarged sectional illustration of the interlocking for clarification of the effects appearing during the process of sterilization.

By the interlocking in accordance with the invention there further arises, however, a further effect which leads to the fact that the thermal expansion of the materials can purposively be exploited for sealing. By the mutual interlocking of the components, the expansions in an axial direction within the webs/grooves namely hinder each other mutually, which has the consequence that—as indicated in FIG. 5-a compressive stress arises at the contact surfaces lying parallel opposite one another.

Seen over the entire length of the stator 12, finally a third effect applies. Namely, if the thermal expansion coefficients of the two sleeves 41, 42 are different, then different length changes arise for the two components during the sterilization. The grooves or webs hinder this movement so that in turn an additional compressive stress appears at the corresponding surfaces. These effects lead finally to the fact that at the connection seam between inner sleeve 41 and outer sleeve 42 an additional sealing effect is brought about exactly when, in the process of sterilization, the stator is surrounded by steam at high temperature and under pressure.

Figure 6:
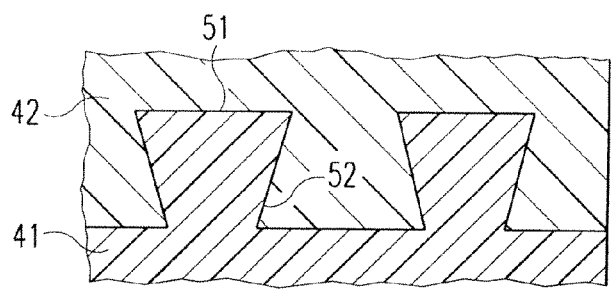
FIGS. 6 and 7 alternative embodiments of the interlocking between inner and outer sleeve and FIG. 8 an alternative embodiment for the arrangement of the stator components.
Figure 7:
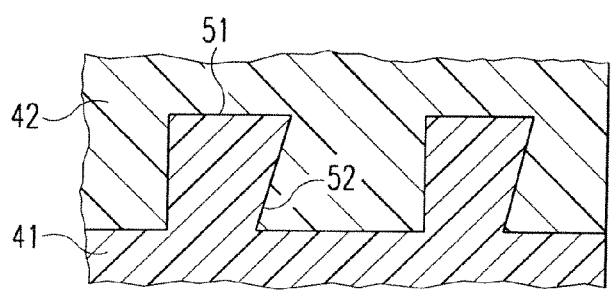

As the alternative embodiments of FIGS. 6 and 7 show, the webs or grooves can also alternatively be configured with a one-sided or two-sided undercut 52. This measure has the consequence that also a lifting in radial direction is hindered. In this context, the dovetail-like profile has proved to be particularly advantageously, because through the two-sided undercut 52 additionally an expansion in radial direction is hindered and thus a contact pressure is also produced at the contact point in the base of the groove between two neighboring webs 51.

The effects mentioned above can be influenced with regard to their effect by the choice of the materials. Through the magnitude of the difference of the thermal expansion coefficients influence can be had in particular on the level of the pressure at the junction points. The higher the difference is, the higher also is the corresponding pressure, whereby however differences which are too great are to be avoided, because it could then come to mechanical damage to the structure. For example it can advantageously be provided to choose for the inner sleeve 41 a material with a somewhat higher expansion coefficient, since in this case the outwardly lying body, that is the outer sleeve 42, hinders the inner sleeve 41 in its expansion, which in turn leads to the fact that the contact pressure is increased at the connection seam. As already mentioned above, it would however also be conceivable to form the inner sleeve of ceramic. The effect just mentioned, that due to a higher expansion coefficient of the inner sleeve the contact pressure at the connection seam is again additionally increased, would in this case, however, not appear; however due to the material characteristics of ceramic the running characteristics of the motor could be additionally improved.

Figure 8:
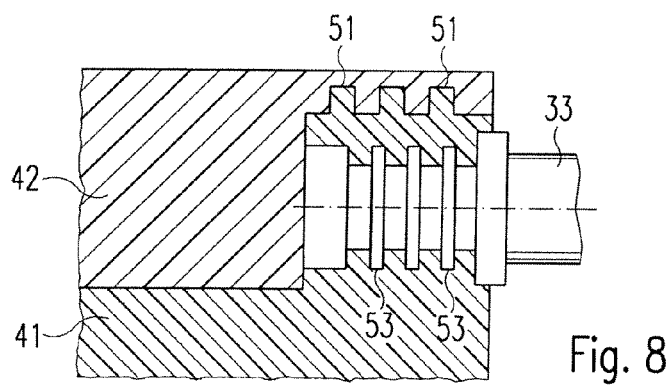

FIG. 8 finally shows an alternative embodiment for the configuration of the stator 12 in accordance with the invention. Here, the connection regions of the contact pins 33 are not in the outer sleeve 42 but instead embedded in the inner sleeve 41. They are in this case, during the production of the inner sleeve 41, surrounded, in particular injected around, by the corresponding material. Also in this case there arise the effects described above for sealing between inner sleeve 41 and contact pins 33. Further, a corresponding interlocking is provided between inner sleeve 41 and outer sleeve.

Finally, through the measures described above a stator is thus provided which is suitable due to its construction to counteract the externally influences during the process of sterilizing. In particular the sensitive components embedded in the sheathing of the stator are protected so well that no damage by the hot steam is to be feared. The motor in accordance with the invention is correspondingly suitable in particularly excellent manner for the use in equipment which must be sterilized repeatedly.

Finally, the concept of the sheathing of sensitive components described above, although described in the context of the description of an electric motor for use in dental, dental-medical or dental-technical handpieces, this concept is, however, in principle suitable for use in components in which bodies or component elements are cast or injected around with a sheathing material for protection from sterilization influences. This sheathing material need not necessarily be the above-mentioned PEEK. Instead generally plastics, silicone, resin or similar materials can be used, for example—as mentioned above—also ceramic.

The invention claimed is:

1. An autoclavable dental handpiece comprising:
an elongate tubular member having a proximal end having a first coupling member adapted to connect to a second coupling member supplying electrical power and flow of fluid to the handpiece, and a distal end having a tool receiver for detachably holding a dental tool in the handpiece;
an electric motor in the tubular member comprising a stator having stator windings, and a rotor comprising a central axial shaft and permanent magnets carried on the shaft;
the stator being positioned in a chamber in the tubular member and being sealed within a sheathing having an inner sleeve and an outer sleeve, the outer sleeve embedding the inner sleeve with functionally relevant components of the stator, to protect the stator windings against exposure to contaminants;
electrical leads extending from the first coupling member at the proximal end of the tubular member into the chamber to conduct electrical power to the stator windings;
a conduit having a web configured to form a seal against at least one of the inner sleeve and the outer sleeve, wherein at least one of the electrical leads passes through the conduit;
bearings mounting the rotor for rotation within and relative to the stator and securing the rotor against axial movement within the tubular member; and
a drive transmission toward the distal end of the tubular member mounted for rotation within the tubular member and connecting an end of the rotor to the tool receiver for rotating the tool receiver when the motor is activated,
wherein the inner sleeve and the outer sleeve are adjoined to, and interlocked with, one another with at least one circumferential web on the inner sleeve and a corresponding configuration on the outer sleeve.

2. The autoclavable dental handpiece of claim 1, wherein the outer sleeve is applied onto the inner sleeve by an injection molding process.

3. The autoclavable dental handpiece of claim 1, wherein the inner sleeve and the outer sleeve are interlocked with each other at two end regions of the stator.

4. The autoclavable dental handpiece of claim 1, wherein at least one of the sleeves is interlocked with a contact pin of the stator.

5. The autoclavable dental handpiece of claim 4, wherein the interlocking is formed by at least one circumferential groove on the contact pin and a corresponding configuration on at least one of the sleeves.

6. The autoclavable dental handpiece of claim 1, wherein the circumferential web on the inner sleeve has a rectangular-shaped profile.

7. The autoclavable dental handpiece of claim 1, wherein the circumferential web on the inner sleeve and corresponding web on the outer sleeve form a dovetail joint.

8. The autoclavable dental handpiece of claim 1, wherein the circumferential web on the inner sleeve has an undercut on one side.

9. The autoclavable dental handpiece of claim 1, wherein the circumferential web on the inner sleeve includes undercuts on two sides.

10. The autoclavable dental handpiece of claim 1, wherein one of the inner sleeve and the outer sleeve is made of a hydrolysis-resistant material.

11. The autoclavable dental handpiece of claim 1, wherein the inner sleeve and the outer sleeve are made of materials having different thermal expansion coefficients.

12. The autoclavable dental handpiece of claim 1, wherein the inner sleeve is formed from a ceramic material.

\* \* \* \* \*